(12) United States Patent
Zhang et al.

(10) Patent No.: US 11,940,081 B2
(45) Date of Patent: Mar. 26, 2024

(54) CABIN PIPELINE USING SUPER THERMAL INSULATION MATERIAL AND PREPARATION METHOD THEREOF

(71) Applicant: CNBM Technology Innovation Academy (Shandong) Co.,Ltd., Zaozhuang (CN)

(72) Inventors: Zhonglun Zhang, Zaozhuang (CN); Mingming Wang, Zaozhuang (CN)

(73) Assignee: CNBM Technology Innovation Academy (Shandong) Co., Ltd., Zaozhuang (CN)

( * ) Notice: Subject to any disclaimer, the term of this patent is extended or adjusted under 35 U.S.C. 154(b) by 0 days.

(21) Appl. No.: 18/447,217

(22) Filed: Aug. 9, 2023

(65) Prior Publication Data

US 2024/0019072 A1     Jan. 18, 2024

Related U.S. Application Data

(63) Continuation of application No. PCT/CN2023/090932, filed on Apr. 26, 2023.

(51) Int. Cl.
| | | |
|---|---|---|
| *F16L 59/02* | (2006.01) | |
| *B32B 1/08* | (2006.01) | |
| *B32B 3/08* | (2006.01) | |
| *B32B 33/00* | (2006.01) | |
| *B32B 38/00* | (2006.01) | |
| *B32B 38/16* | (2006.01) | |
| *F16L 59/14* | (2006.01) | |

(52) U.S. Cl.
CPC .............. *F16L 59/028* (2013.01); *B32B 1/08* (2013.01); *B32B 3/08* (2013.01); *B32B 33/00* (2013.01); *F16L 59/14* (2013.01); *B32B 2038/002* (2013.01); *B32B 2038/0076* (2013.01); *B32B 38/162* (2013.01); *B32B 2255/06* (2013.01); *B32B 2255/26* (2013.01); *B32B 2255/28* (2013.01); *B32B 2305/72* (2013.01); *B32B 2307/304* (2013.01); *B32B 2307/7376* (2023.05); *B32B 2307/752* (2013.01)

(58) Field of Classification Search
CPC .......... F16L 59/028; F16L 59/14; B32B 1/08; B32B 3/08; B32B 33/00; B32B 38/162; B32B 2038/002; B32B 2038/0076; B32B 2255/06; B32B 2255/26; B32B 2255/28; B32B 2305/72; B32B 2307/304; B32B 2307/7376; B32B 2307/752
See application file for complete search history.

(56) References Cited

FOREIGN PATENT DOCUMENTS

| | | |
|---|---|---|
| CN | 201802998 U | 4/2011 |
| CN | 104553108 A | 4/2015 |
| CN | 104676141 A | 6/2015 |
| CN | 108057594 A | 5/2018 |
| CN | 208168335 U | 11/2018 |
| CN | 209026335 U | 6/2019 |
| CN | 209819048 U | 12/2019 |
| CN | 112497872 A | 3/2021 |
| CN | 113042341 A | 6/2021 |
| CN | 114593280 A | 6/2022 |
| WO | WO9312370 A2 | 6/1993 |

*Primary Examiner* — Michael C Miggins
(74) *Attorney, Agent, or Firm* — Nitin Kaushik

(57) ABSTRACT

Disclosed are a cabin pipeline using a super thermal insulation material and a preparation method thereof, comprising an electrically conductive inner pipe, an anti-corrosion coating coated on the electrically conductive inner pipe, a thermal insulation layer formed by a super thermal insulation material wound on the anti-corrosion coating, and a resin sealing layer coated on an outside of the thermal insulation layer. The electrically conductive inner pipe has excellent corrosion resistance to liquefied natural gas in the pipeline; the protective layer formed by the anti-corrosion coating and the resin sealing layer can prevent the electrically conductive inner pipe from being directly exposed to the environment due to long-term seawater infiltration or accidental damage of the outer layer, avoid electrochemical corrosion and further improve the corrosion resistance.

4 Claims, No Drawings

CABIN PIPELINE USING SUPER THERMAL INSULATION MATERIAL AND PREPARATION METHOD THEREOF

CROSS-REFERENCE TO RELATED APPLICATIONS

The application claims priority to Chinese patent application No. 2022101885740, filed on Feb. 28, 2022, the entire contents of which are incorporated herein by reference.

TECHNICAL FIELD

The present invention relates to a pipeline and a preparation method thereof, and particularly to a cabin pipeline using a super thermal insulation material and a preparation method thereof, belonging to the field of marine oil and gas pipelines.

BACKGROUND

There are three modes to transport liquefied natural gas: shipping, trucking and pipeline transportation. Among these three modes of transportation, shipping is the main mode of transportation of liquefied natural gas, i.e. receiving natural gas from oil wells through transportation pipelines, after being processed and qualified, storing it in cabin for transportation, which accounts for more than 80% of the world's liquefied natural gas transportation.

A large amount of oil pollution, toxic products, dust and harmful substances resulting from the spoilage of some organic matters remain in the cabin for transporting liquefied natural gas, and the cabin is subjected to strong electrochemical corrosion by seawater and corrosion by a large amount of microorganisms in seawater in addition to the above toxic and harmful substances due to long-term navigation at sea.

The existing natural gas transportation pipelines in the cabin are mainly steel pipes, but the natural gas formed in sulfur-bearing oil fields often contains hydrogen sulfide, and the entrained water vapor dissolved in the natural gas forms $H_2S$ aqueous solution. The $H_2S$ aqueous solution has strong corrosivity, which will cause hydrogen embrittlement of steel pipe, forming fine cracks in the steel, reducing the toughness of steel pipe and making it brittle. Under the action of pulling stress and residual tensile stress, the fine cracks continue to extend and expand, finally leading to the fracture of steel pipe. The corrosion rate of the steel pipe is higher due to the long-term contact of the pipeline for transporting liquefied natural gas in the cabin with seawater.

The existing anti-corrosion process of natural gas steel pipe in cabin is to add a coating on the steel pipe to form an insulation material through the coating, to prevent the electrolyte in seawater from directly contacting the steel pipe, or to increase the wall thickness of the steel pipe; however, the addition of the coating does not fundamentally solve the above-mentioned problems, and as the coating falls off after aging, seawater will still contact the steel pipe, and make it corroded; in addition, the increase of the thickness of steel pipe will increase its cost, which is not conducive to the handling and installation of steel pipes.

SUMMARY

To this end, the present invention provides a cabin pipeline using a super thermal insulation material and a preparation method thereof to solve the above-mentioned problems in the prior art.

In order to achieve the above-mentioned object, the present invention adopts the following technical solution:

A cabin pipeline using a super thermal insulation material comprises an electrically conductive inner pipe, an anti-corrosion coating coated on the electrically conductive inner pipe, a thermal insulation layer formed by a super thermal insulation material wound on the anti-corrosion coating, and a resin sealing layer coated on an outside of the thermal insulation layer;

The electrically conductive inner pipe is an aluminum alloy or a copper alloy;

The anti-corrosion coating is a coating formed after an epoxy coating is cured.

Further, the thermal insulation layer comprises a first winding layer and a second winding layer, wherein the first winding layer is formed by winding a strip-shaped super thermal insulation material with a width of 20-30 cm in a clockwise direction, and the second winding layer is wound outside the first winding layer and is formed by winding a strip-shaped super thermal insulation material with a width of 30-50 cm in a counterclockwise direction.

Further, the super thermal insulation material is an aerogel thermal insulation felt;

The thermal conductivity of the aerogel thermal insulation felt at 25° C. is 0.014-0.025 W/(m·K), a density of which is 140-250 kg/m$^3$, and a combustion grade of which is A.

The aerogel thermal insulation felt is prepared by combining a wet gel and a fibrous felt in a supercritical drying manner.

Further, the epoxy coating is prepared from the following raw materials in parts by weight: an epoxy resin 50-70 parts, a curing agent 10-20 parts, a coupling agent 0.1-0.5 parts, and a filler 20-40 parts.

Further, the curing agent is an amine-based curing agent;

The coupling agent is any one or a mixture of silane coupling agent KI-1530, silane coupling agent KH550, silane coupling agent KH560, and silane coupling agent KH570;

The filler is any one or a mixture of titanium white powder, corundum powder and wollastonite powder.

Further, a resin of the resin sealing layer is any one of an epoxy resin, a phenolic resin, a bismaleimide resin, and a benzoxazine resin.

The present invention also provides a preparation method of a cabin pipeline using a super thermal insulation material, comprising the following steps of:

(1) degreasing and sandblasting a surface of the electrically conductive inner pipe to increase the surface roughness and adhesion, and then pre-heating;

(2) spraying an epoxy coating on the surface of the preheated electrically conductive inner pipe, the spraying thickness being 20-50 μm, and after spraying, curing to form an anti-corrosion coating;

(3) winding a super thermal insulation material on the anti-corrosion coating to form a thermal insulation layer;

(4) coating a surface of the thermal insulation layer with a resin, the coating thickness being 2-3 mm, curing to form a resin sealing layer, to obtain the cabin pipeline using the super thermal insulation material.

Further, the degreasing treatment in step (1) is to physically or chemically remove grease, paint layer and oxide on the surface of the thermal conductive inner pipe, such as using a redox reaction, sanding, shot blasting and the like;

The pre-heating is to heat to 170° C.-230° C.

Further, the spraying in step (2) is performed by using an electrostatic spraying apparatus or a fluidized bed.

Further, the curing in step (2) and/or step (4) is to cure at 220° C.-240° C. for 0.5-1.5 h.

An advantageous effect of the present invention is that the cabin pipeline using the super thermal insulation material of the present invention has strong impact resistance, a long service life, and excellent mechanical properties and thermal insulation properties. The electrically conductive inner pipe has excellent corrosion resistance to liquefied natural gas in the pipeline, can resist the corrosion of most salts, acids and alkalis, especially can resist the corrosion of acid gases such as hydrogen sulfide and carbon dioxide, and compared with the conventional steel pipe, the mass of the electrically conductive inner pipe is significantly reduced, thereby saving the cost of handling and installation and improving the efficiency; the aerogel thermal insulation felt not only has excellent thermal insulation performance, but also has the physical characteristics and mechanical properties of elastic felt, which endows pipeline with excellent thermal insulation and mechanical properties; the protective layer formed by the anti-corrosion coating and the resin sealing layer can prevent the electrically conductive inner pipe from being directly exposed to the environment due to long-term seawater infiltration or accidental damage of the outer layer, avoid electrochemical corrosion and further improve the corrosion resistance.

DETAILED DESCRIPTION OF THE EMBODIMENTS

The technical solution of the embodiments of the present invention will now be clearly and fully described in detail. Obviously, the embodiments described are only a few, but not all embodiments of the present invention. Based on the embodiments of the present invention, all other embodiments obtained by a person of ordinary skill in the art without inventive effort fall within the scope of the present invention.

In the following embodiments, the structure of the cabin pipeline using a super thermal insulation material is successively composed from the inside to the outside of an electrically conductive inner pipe, an anti-corrosion coating coated on the electrically conductive inner pipe, a thermal insulation layer formed by a super thermal insulation material wound on the anti-corrosion coating, and a resin sealing layer coated on an outside of the thermal insulation layer; Wherein the super thermal insulation material is an aerogel thermal insulation felt;

The thermal insulation layer comprises a first winding layer and a second winding layer, wherein the first winding layer is formed by winding a strip-shaped super thermal insulation material with a width of 20-30 cm in a clockwise direction, and the second winding layer is wound outside the first winding layer and is formed by winding a strip-shaped super thermal insulation material with a width of 30-50 cm in a counterclockwise direction.

In the operation steps of the following embodiments, the degreasing treatment is to physically or chemically remove grease, paint layer and oxide on the surface of the thermal conductive inner pipe, such as using a redox reaction, sanding, shot blasting and the like;

The spraying is performed by using an electrostatic spraying apparatus or a fluidized bed;

Other structures, operations or materials not specifically described are conventionally understood.

Embodiment 1

A preparation method of a cabin pipeline using a super thermal insulation material comprises the following steps of:

(1) degreasing and sandblasting a surface of the aluminum alloy electrically conductive inner pipe, and then heating to 200° C. for pre-heating;
(2) preparing an epoxy coating by taking 60 g of an epoxy resin, 20 g of an amine-based curing agent, 0.3 g of a mixture of a silane coupling agent KH530, a silane coupling agent KH550 and a silane coupling agent KH570, and 20 g of titanium white powder, and spraying the epoxy coating on the surface of the preheated aluminum alloy electrically conductive inner pipe, the spraying thickness being 20-50 μm, and after spraying, curing at 230° C. for 1 h to form an anti-corrosion coating;
(3) winding a super thermal insulation material on the anti-corrosion coating to form a thermal insulation layer;
(4) coating a surface of the thermal insulation layer with a phenolic resin, the coating thickness being 2-3 mm, curing at 230° C. for 1 h to form a resin sealing layer, to obtain the cabin pipeline using the super thermal insulation material.

Embodiment 2

A preparation method of a cabin pipeline using a super thermal insulation material comprises the following steps of:

(1) degreasing and sandblasting a surface of the copper alloy electrically conductive inner pipe, and then heating to 170° C. for pre-heating;
(2) preparing an epoxy coating by taking 50 g of an epoxy resin, 10 g of an amine-based curing agent, 0.1 g of a mixture of a silane coupling agent KH550 and a silane coupling agent KH560, and 20-40 g of a mixture of a titanium white powder and a corundum powder, and spraying the epoxy coating on the surface of the preheated copper alloy electrically conductive inner pipe, the spraying thickness being 20-50 μm, and after spraying, curing at 220° C. for 0.5 h to form an anti-corrosion coating;
(3) winding a super thermal insulation material on the anti-corrosion coating to form a thermal insulation layer;
(4) coating a surface of the thermal insulation layer with an epoxy resin, the coating thickness being 2-3 mm, curing at 220° C. for 0.5 h to form a resin sealing layer, to obtain the cabin pipeline using the super thermal insulation material.

Embodiment 3

A preparation method of a cabin pipeline using a super thermal insulation material comprises the following steps of:

(1) degreasing and sandblasting a surface of the aluminum alloy electrically conductive inner pipe, and then heating to 230° C. for pre-heating;
(2) preparing an epoxy coating by taking 70 g of an epoxy resin, 20 g of an amine-based curing agent, 0.5 g of a mixture of a silane coupling agent KH530 and a silane coupling agent KH560, and 40 g of a wollastonite powder, and spraying the epoxy coating on the surface of the preheated aluminum alloy electrically conductive inner pipe, the spraying thickness being 20-50 μm, and after spraying, curing at 240° C. for 1.5 h to form an anti-corrosion coating;
(3) winding a super thermal insulation material on the anti-corrosion coating to form a thermal insulation layer;

(4) coating a surface of the thermal insulation layer with a benzoxazine resin, the coating thickness being 2-3 mm, curing at 240° C. for 1.5 h to form a resin sealing layer, to obtain the cabin pipeline using the super thermal insulation material.

Performance Test

Performance tests are performed on the cabin pipelines prepared in Embodiments 1-3 above, and the test methods and results are as follows:

| Items | Test methods | Embodiment 1 | Embodiment 2 | Embodiment 3 |
|---|---|---|---|---|
| Water resistance | GB/T1733 - 1993 | Nondestructive | Nondestructive | Nondestructive |
| Corrosion resistance | GB1763-1979 | Nondestructive | Nondestructive | Nondestructive |
| Thermal conductivity at 25° C. (W/(m · K)) | GB/T10295 - 2008 | 0.019 | 0.017 | 0.020 |

What is claimed is:

1. A cabin pipeline using a super thermal insulation material, comprising an electrically conductive inner pipe, an anti-corrosion coating coated on the electrically conductive inner pipe, a thermal insulation layer formed by the super thermal insulation material wound on the anti-corrosion coating, and a resin sealing layer coated on an outside of the thermal insulation layer;

the electrically conductive inner pipe being an aluminum alloy or a copper alloy;

the anti-corrosion coating being a coating formed after an epoxy coating is cured, wherein the epoxy coating is prepared from following raw materials in parts by weight: an epoxy resin 50-70 parts, a curing agent 10-20 parts, a coupling agent 0.1-0.5 parts, and a filler 20-40 parts, the curing agent being an amine-based curing agent, the coupling agent being any one or a mixture of silane coupling agent KH530, silane coupling agent KH550, silane coupling agent KH560, and silane coupling agent KH570, and the filler being any one or a mixture of titanium white powder, corundum powder and wollastonite powder;

the super thermal insulation material being an aerogel thermal insulation felt, and thermal conductivity at 25° C. being 0.014-0.025 W/(m·K);

the thermal insulation layer comprising a first winding layer and a second winding layer, wherein the first winding layer is formed by winding a strip-shaped super thermal insulation material with a width of 20-30 cm in a clockwise direction, and the second winding layer is wound outside the first winding layer and is formed by winding a strip-shaped super thermal insulation material with a width of 30-50 cm in a counterclockwise direction;

a resin of the resin sealing layer being any one of an epoxy resin, a phenolic resin, a bis-maleimide resin, and a benzoxazine resin.

2. A preparation method of the cabin pipeline of claim 1, comprising following steps of:

1) degreasing and sandblasting a surface of the electrically conductive inner pipe, and pre-heating to 170° C.-230° C.;

2) spraying an epoxy coating on the surface of a preheated electrically conductive inner pipe, a spraying thickness being 20-50 μm, and after spraying, curing at 220° C.-240° C. for 0.5-1.5 h to form the anti-corrosion coating;

3) winding the super thermal insulation material on the anti-corrosion coating to form a thermal insulation layer; and 4) Coating a surface of the thermal insulation layer with the resin, a coating thickness being 2-3 mm, and curing at 220° C.-240° C. for 0.5-1.5 h to form the resin sealing layer, to obtain the cabin pipeline using the super thermal insulation material.

3. The method of claim 2, wherein a step of degreasing comprises physically or chemically removing grease, paint layer and oxide on the surface of the electrically conductive inner pipe.

4. The method of claim 2, wherein the spraying in step 2) is performed by using an electrostatic spraying apparatus or a fluidized bed.

* * * * *